April 28, 1953 — L. J. ANDRES — 2,636,385
HYDROSPEEDOMETER
Filed Dec. 22, 1949 — 2 SHEETS—SHEET 1

INVENTOR.
Lloyd J. Andres

April 28, 1953   L. J. ANDRES   2,636,385
HYDROSPEEDOMETER
Filed Dec. 22, 1949   2 SHEETS—SHEET 2
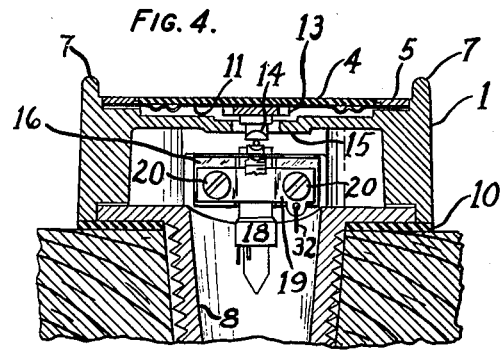
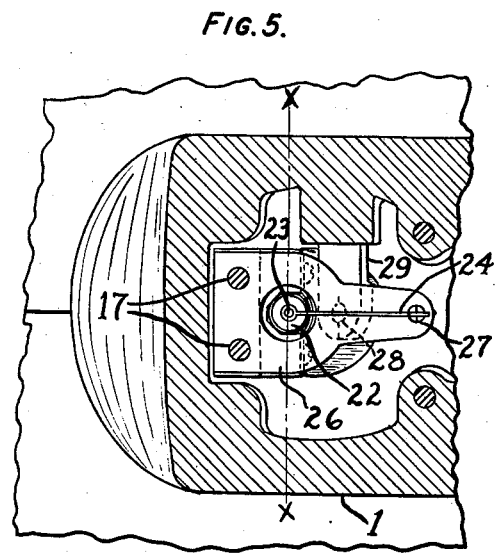
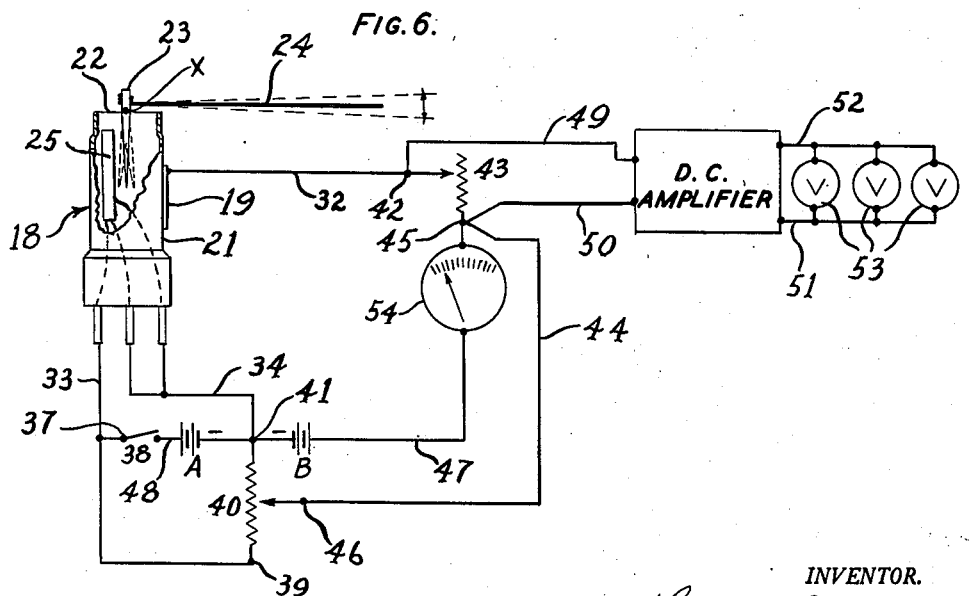
INVENTOR.
Lloyd J. Andres Patented Apr. 28, 1953

2,636,385

UNITED STATES PATENT OFFICE 2,636,385

HYDROSPEEDOMETER

Lloyd J. Andres, Chicago, Ill., assignor to Permo, Incorporated, Chicago, Ill.

Application December 22, 1949, Serial No. 134,565

6 Claims. (Cl. 73—182)

This invention relates in general to speedometers and more particularly to an electronic device for measuring the velocity of moving fluids, boats, aircraft and the like. Prior to this invention the velocity of moving bodies in fluids and vice versa are commonly measured through the use of Pitot tubes or propeller-driven speedometers. In practice, particularly in boats, the Pitot tube is frought with difficulties such as clogging and corrosion of the orifice therein, resulting in improper speed indication or the complete destruction of the tube itself as a result of collision with objects in the water. The propeller-type speedometers are likewise inaccurate and subject to damage by collision and their calibration is dependent upon transmissions which in themselves introduce undesirable variables which adversely affect the calibration of the device.

The present invention overcomes the above and other objections found in conventional speedometers through the provision of an electronic sensing device having a portion of its area in contact with and responsive to the velocity head of the fluid. The sensing device is connected to electric remote control means for indicating the velocity head of the fluid encountered. Its operation is not impaired by the presence of debris which would normally clog a Pitot tube or impair the operation of a propeller-type speedometer and its construction is such as to inherently avoid damage from collision.

A principal object of the invention is the provision of a casing adapted to be secured to a body movable in fluids, a portion of which is responsive to the velocity head of the fluid, the velocity of which is interpreted by an electronic transducer in the casing connected to a circuit means for operating a remote electric indicator.

Another object of the invention is the provision of a sensing device consisting of a casing having a diaphragm means therein in contact with the fluid and responsive to the velocity head thereof, including an electronic transducer and a linkage for the operation of said transducer by said diaphragm means including a remotely connected electric instrument and circuit means for proportionately indicating the displacement of said diaphragm means.

A further object of the invention is the provision of a diaphragm operated speedometer including a vacuum tube transducer responsive to the movement of said diaphragm and adjustable spring means for establishing a predetermined range of movement of said diaphragm.

A further object of the invention is the provision of an electronic velocity sensing device having a diaphragm adapted to deflect one element of a vacuum tube transducer in proportion to the velocity head of moving fluid and having said transducer connected by circuit means to an electric indicating instrument including an auxiliary circuit means for balancing static pressure components of said fluid and calibrating said instrument in direct terms of the velocity head of said fluid.

These and other objects in one embodiment of the invention are described and shown in the following specification and drawings in which:

Fig. 4 is an enlarged cross-sectional view of the device taken through section line 4—4 Fig. 1.

Fig. 5 is an enlarged cross-sectional view taken through section line 5—5 Fig. 1.

Fig. 6 is a schematic circuit diagram of the speedometer.

Figures 1, 2, 3:
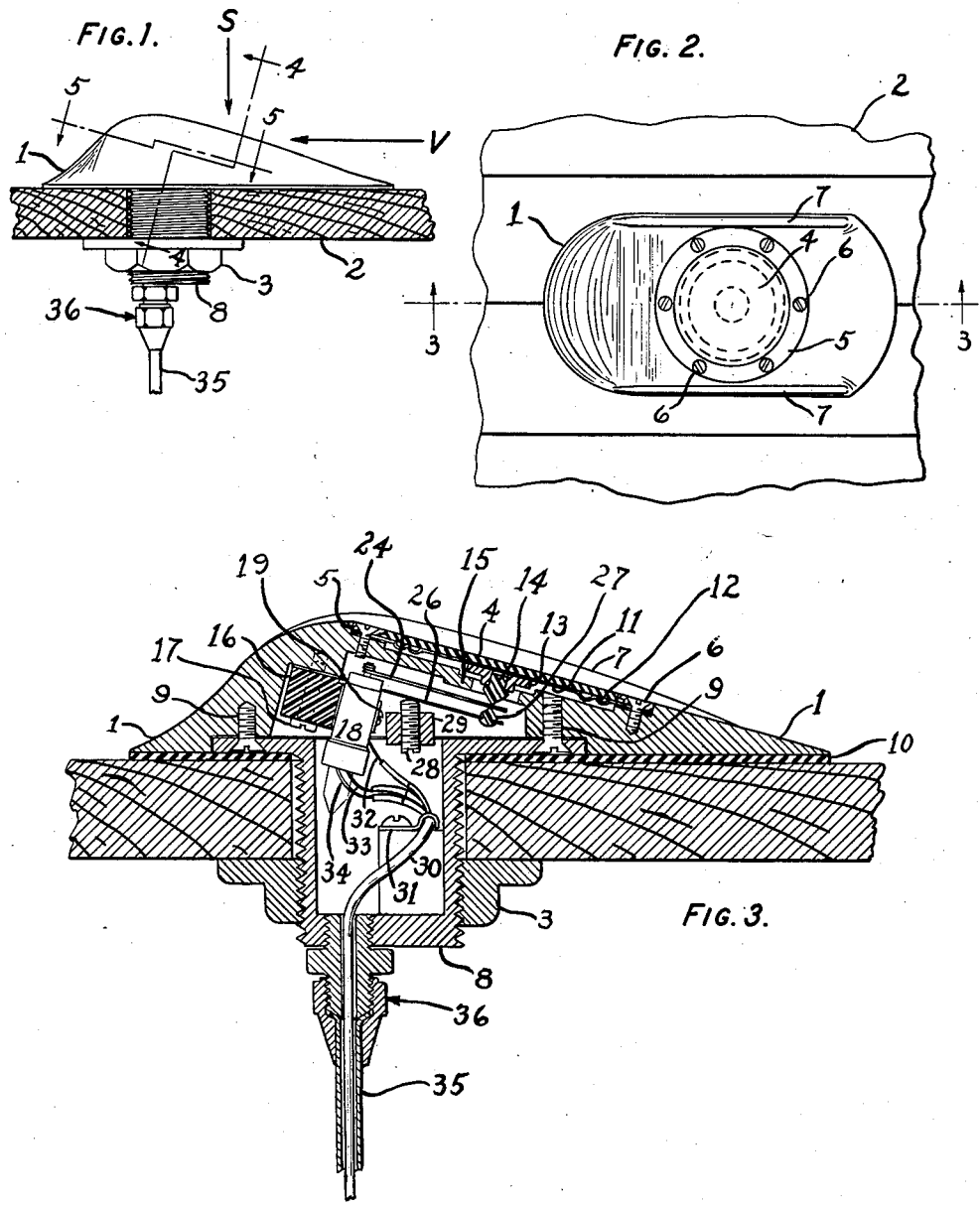
Fig. 1 is an elevation of the fluid sensing device secured in a body.
Fig. 2 is a plan view of the portion of the device in contact with the fluid.
Fig. 3 is an enlarged cross-sectional view of the device taken through section line 3—3 Fig. 2.

The drawings and the following description illustrate an embodiment of the speedometer particularly adapted to hydro and marine use in which the outer casing 1, Fig. 1, is intended to be secured against the outer surface of the hull 2 of a boat below the waterline by means of a nut 3. The arrows S and V indicate the effective directions of the static and velocity fluid heads respectively.

Referring to Figs. 2 and 3 a protective rubber diaphragm 4 is secured flush with the sloping surface of the casing by a retainer ring 5, which ring is also secured flush with and in a recess in the casing by screws 6—6. A pair of parallel ribs 7—7, integral with the casing 1, extend above the surface of the diaphragm for protection thereof from damage.

Referring to the enlarged cross-sectional view shown Fig. 3, the hollow casing 1 is attached and sealed to a threaded base member 8 by screws 9 providing a watertight cavity therein. A watertight gasket 10 is retained between the inside surface of the casing 1 and the hull to prevent leakage.

A metal diaphragm 11 is positioned adjacent to and in contact with the rubber diaphragm 4 and also retained in watertight relation to the casing 1 by screws 6. The concentric corrugations 12, as shown, may be dispensed with in cases where extreme compliance of the diaphragm is not required. A circular collar 13 integral and concentric with the diaphragm 11 serves the dual purpose of holder for a V bearing 14 and safety stop. Excessive movement of the metal diaphragm is prevented by the engagement of the inner surface of the collar with the abutment portion 15 of the casing 1. It is to be noted that the protective diaphragm 4 can be made of one of many flexible materials and is provided only to protect the metal diaphragm from abrasion and corrosion.

A transducer tube support 16, made of insulating material, is secured in the casing 1 by screws 17—17 and a diode type vacuum tube electronic transducer 18 is retained in a groove in said support, in position shown, by saddle 19 held by screws 20, better shown Fig. 4.

The transducer illustrated in Figs. 3, 5 and 6 consists of an evacuated cylindrical metal shell 21 having a sensitive circular diaphragm 22 integral with one end thereof. An anode lever 23 secured and sealed in the center of the diaphragm 22 extends into the tube and, in effect, is a movable anode element. An electron emitting cathode element 25 is secured in the tube in fixed spaced relation with said anode element. The cathode is adapted to be heated by a conventional internal heater element, not shown. The electric connections to the heater element and the cathode are brought out through a glass seal in the base of the tube. It is apparent that the alternate use of a filament-type cathode would serve the same purpose as element 25.

An offset arm 24 formed from relatively stiff spring wire is attached to the outer end of lever 23. Thus it is apparent that when the arm 24 is moved through the angle shown in dotted lines (Fig. 6) the diaphragm 22 will flex about its axis X and move the inner end of the anode lever 23 proportionately with respect to the fixed cathode element 25.

Referring to Figs. 3 and 5 a flat adjustment spring 26, having a clearance hole therein for the end of tube 18, is secured at one end between support 16 and casing 1 by screws 17—17. A second V bearing 27 is secured in the outer end portion of spring 26 coaxial with and adjacent to V bearing 14 with the outer end portion of arm 24 clamped between and normal to the V edges of the two bearings. Adjustment screw 28 is threaded through projection 29 integral with casing 1, with the inner end of the screw in contact with spring 26. Since arm 24 and the casing 1 are at different electrical potentials when the tube 18 is energized the bearings 14 and 27 are necessarily made of insulating material. The screw 28 is normally adjusted to tension the spring 26 and to urge the outer end of arm 24 against bearing 14 and load the metal diaphragm 11 in an outward direction. This initial positioning will move the inner anode end of lever 23, shown Fig. 6, to a predetermined maximum distance away from the cathode 25.

Referring to Fig. 3 a three-conductor cable 30 is retained by strain clip 31 in the cavity of base member 3 as shown. One said conductor, 32, is connected to saddle 19, the second conductor, 33, is connected to one heater terminal of transducer 18, and the third conductor, 34, is connected to the remaining heater terminal of the cathode 25 of transducer 18.

Since the sensing device of the speedometer, shown Fig. 1, usually terminates in the bilge compartment of a boat care must be exercised to prevent moisture coming in contact with the internal parts of the device and to this end a small metal conduit 35 is attached to and sealed to the base 8 by well known connection 36 through which the cable 30 is attached to the remotely connected control circuit and indicating instrument.

When the rubber diaphragm 4 of the sensing device encounters variable velocity heads in a fluid, illustrated by arrow V, Fig. 1, it will exert proportionate components of pressure normal to the metal diaphragm 11, thus moving inwardly bearing 14, arm 24, and bearing 27 against the restraining action of the adjustment spring 26. The angular movement of arm 24 will proportionately move the anode element of lever 23 into closer proximity with the cathode element 25, the electronic action of which will be hereinafter described. Thus it is apparent that the lever 23 will be deflected distances in proportion to the velocity head of the fluid in contact with the rubber diaphragm 4.

It has been found that the rubber diaphragm will respond to fluid velocity heads when mounted flush with the surface of the hull, but since the displacement of the diaphragm 11 in relation to the movement of the fluid is non-linear, a more accurate measurement of relatively small velocity heads is obtained when the diaphragm of the device is mounted at a small divergent angle with respect to the outer surface of the hull.

Fig. 6 illustrates an electric circuit for energizing and controlling the transducer tube in the sensing device. The circuit also includes indicating means for observing various fluid heads in terms of velocity. Also included in the control circuit is means for nullifying the static pressure head which otherwise would be indicated on the indicating instrument.

Conductor 33 is connected to one terminal of the cathode heater of the transducer tube and terminal 37 of an on-off switch 38 and terminal 39 of zero adjusting potentiometer 40. Conductor 34 connects the remaining terminal of the cathode heater, the cathode 25, terminal 41 of potentiometer 40 and the negative terminals of the A and B batteries respectively. Conductor 32 is connected to saddle 19 which is in contact with metal shell 21 of the tube and completes a connection to the anode and of lever 23 through the metal diaphragm 22 and its opposite end is connected to terminal 42 of a variable anode load resistor 43. A conductor 44 is connected to the remaining terminal 45 of resistor 43 and to one terminal of a sensitive microammeter 54 and to remaining terminal 46 of the potentiometer 40. A conductor 47 connects the positive terminal of the B battery to the remaining terminal of the microammeter 54. A conductor 48 connects the remaining terminal of an on-off switch 38 to the positive terminal of the A battery.

An auxiliary circuit for additional remote indicating stations contemplates a direct current amplifier, as shown, having its input connected across the anode load resistor 43 by conductors 49 and 50 and having its output connected to one or a plurality of volt meters 53 by conductors 51 and 52.

In operation and when the master switch 38 is closed the cathode 25 will be heated by virtue of the circuit completed through conductors 33 and 34 to the cathode heater and the B battery will complete an anode circuit through a transducer tube through conductors 34 and 32, load resistor 43, a portion of conductor 44, microammeter 54 and conductor 47. The magnitude of the anode current is dependent upon the position of the anode end of lever 23 with respect to the cathode 25 and since it is desirable to indicate only the fluid velocity head on the meter the normal residual minimum anode current in the tube plus whatever increase in this current is due to the deflection of lever 23 as a result of static fluid pressure may be nullified by adjusting the potentiometer 40 through which current is caused to flow through the microammeter 54 by conductor 44 in a direction opposite the anode current. For example, if the ambient anode current through the transducers for a given B battery potential is 50 microamperes, then in order to establish zero reading from the meter 54, the potentiometer 40 will require adjustment corresponding to the flow of 50 microamperes from the A battery through the meter 54 to nullify the aforementioned anode current. When the microammeter is thus caused to indicate a zero reading then any further deflection of the anode lever 23 by the diaphragm of the sensing device will indicate velocity head of the fluid in contact with the sensing device. It is apparent that the scale of the microammeter may be calibrated direct in terms of velocity or miles per hour. Furthermore, in order to extend the range of the intrument the scale may have multiple calibrations corresponding to predetermined adjustments of the load resistor 43 and/or the application of appropriate shunts to the microammeter.

When a direct current amplifier is connected as shown it will proportionately amplify the voltage drop that appears across the resistor 43, which voltage drop is proportionate to the output of the transducer tube as controlled by the sensing device. Thus the volt meters 53 may be calibrated in terms of fluid velocity similar to the calibration of the microammeter 54. It is apparent that in certain cases it may be desirable to dispense with the microammeter as indicating device and use only the variable voltage drop across the resistor 43 as a means of velocity measurement.

It will be apparent to those skilled in this art that the transducer output circuit may be modified to include well-known circuits including other electric responsive means for indicating or recording the variable output of the transducer tube without departing from the spirit and scope of this invention.

It is also apparent that the sensing unit and its associated circuit means may be used for indicating depths or heights of fluid since the response of the sensing unit is proportionate to static fluid pressure and the indicating means may be calibrated direct in terms of fluid height when no fluid velocity head is present.

Having described my invention I claim:

1. A fluid speedometer comprising a sensing device consisting of a casing, a diaphragm means secured in said casing substantially flush to and outside the surface thereof and responsive to the velocity head of fluids in direct contact therewith, an electronic transducer tube secured in said casing, one internal element in said tube having a substantially rigid external extension adapted for movement, a compliant member connected to said extension, said diaphragm means including contact means having contact engagement only with said compliant member at a point along its length remotely situated from said extension in combination with an electric meter for proportionately indicating variable quantities of electric energy, a source of electric energy, a circuit means connecting said tube, said meter and said source of energy for energizing said tube and said meter whereby a variable velocity head of fluid in contact with said sensing device will proportionately deflect said diaphragm means, said compliant member, said extension and said element and simultaneously and proportionately vary the electric energy through said circuit means, through said tube and said meter to variably indicate said energy on said meter in a predetermined proportion corresponding with the velocity head of the fluid.

2. A speedometer for measuring a predetermined range of velocity heads in a moving fluid comprising a casing, a diaphragm secured and sealed in said casing and responsive to static and velocity heads of said fluid, said diaphragm having its outer surface positioned directly in contact with said fluid in a plane at a predetermined angle with respect to and opposing the direction of movement of said fluid, an electronic transducer tube means secured in said casing, one internal element in said tube having an external extension adapted for movement, a compliant member connected to said extension, said diaphragm means including contact means having contact engagement only with said compliant member at a point along its length remotely situated from said extension, an electric meter for indicating variable electric energy, a source of electric energy, circuit means connecting said tube means, said meter and said source of electric energy for normally energizing said tube and said meter whereby a fluid having predetermined velocity moving in contact with said casing will deflect said diaphragm and move said compliant member and displace said element a predetermined proportionate distance and vary the electric energy through said circuit means, said tube means and said meter and indicate thereon said change in electric energy on said meter in terms of the predetermined velocity of the said fluid.

3. A sensing device for an electronic fluid speedometer adapted to be submerged in a fluid comprising a casing, a diaphragm means sealed in said casing and positioned substantially flush with the outer surface thereof and adapted to be displaced distances corresponding to the combined static and velocity heads of said fluid, an electronic transducer tube having its outer envelope secured in said casing, one element in said tube having a pivotal mounting and extending through a sealed resilient portion of said envelope and adapted for pivotal movement, a compliant lever means connected to said element extension for pivotal movement therewith and said diaphragm means including contact means having contact engagement only with said compliant lever means at a point along its length remotely situated from its point of engagement with said element extension, spring means attached at one end thereof to said casing and having its opposite end in pivotal contact with said lever means for normally biasing said lever means, said element and said diaphragm in one direction, electric means for normally energizing said tube and establishing a predetermined normal output current therefrom whereby the deflection of said diaphragm by a predetermined fluid head will move said lever and said element against the restraining action of said spring means and vary said output current a predetermined degree.

4. In a fluid head sensing device a casing, said casing having a sloping outer surface positioned for contact with a moving fluid, a resilient diaphragm sealed in said casing having a portion of its outer area position substantially flush with said sloping outer surface, a pair of parallel projections integral with said casing extending outward from said sloping outer surface and projecting above said diaphragm, an electronic transducer tube secured in said casing, said tube having a plurality of elements therein one of said internal elements in said transducer tube and its outward extension thereof adapted for movement, the electric output of said transducer tube adapted to be controlled by movement of said element when energized, compliant transmission means connected to said extension, said diaphragm including contact means having contact engagement only with said compliant transmission means at a point along its length remotely located from its point of engagement with the outward extension of said internal element for transmitting proportionate movement of said diaphragm to said element whereby the movement of said diaphragm by the velocity head of said fluid will proportionately control the electric output of said transducer tube, said sloping outer surface being inclined to the direction of fluid flow.

5. A sensing device for an electronic fluid speedometer adapted to be submerged in a fluid comprising a casing, a diaphragm means sealed in said casing and adapted to be displaced distances corresponding to the combined static and velocity heads of said fluid, an electronic transducer tube having its outer envelope secured in said casing, one element in said tube extending through a sealed resilient portion of said envelope and adapted for movement, lever means secured at one end to said element, said diaphragm means including contact means having contact engagement only with said lever means at a point along its length remotely situated from its point of engagement with said element, spring means secured at one end to said casing and having its opposite end in contact with said lever means for normally urging said lever means, said element and said diaphragm in one direction, screw means in said casing in contact with said spring means for adjusting to normal position said internal element, electric circuit means for normally energizing said tube and establishing a predetermined normal output current therefrom whereby the deflection of said diaphragm by a predetermined fluid head will move said lever and said element against the restraining action of said spring and vary said output current a predetermined degree.

6. A fluid speedometer comprising a sensing device consisting of a casing, diaphragm means secured substantially flush to an outer surface of said casing and adapted for direct contact with and responsive to variable velocity heads of fluids, an electronic transducer tube having an output circuit secured in said casing, one internal element in said tube having a substantially rigid external extension adapted for movement, a compliant lever means rigidly connected to said extension, said diaphragm means including contact means having contact engagement only with said compliant lever means at a point along its length remotely situated from its point of engagement with said extension for transmitting proportionate movement of said diaphragm means to said extension in combination with electric circuit means for normally energizing said tube connected with said output circuit, a source of electric energy connected to said electric circuit means for energizing said tube, a load resistor in said output circuit whereby a predetermined voltage will normally appear across said load resistor when said tube is energized and whereby a variable velocity head of fluid moving in contact with said sensing device will proportionately deflect said diaphragm means, said extension, said compliant member and said element and simultaneously and proportionately vary the voltage drop across said resistor in a predetermined proportion corresponding with the velocity head of said fluid.

LLOYD J. ANDRES.

References Cited in the file of this patent

UNITED STATES PATENTS

| Number | Name | Date |
|---|---|---|
| 1,255,034 | Mason | Jan. 29, 1918 |
| 2,112,682 | Ryder | Mar. 29, 1938 |
| 2,155,419 | Gunn | Apr. 25, 1939 |
| 2,178,422 | Heagney | Oct. 31, 1939 |
| 2,543,020 | Hess | Feb. 27, 1951 |

FOREIGN PATENTS

| Number | Country | Date |
|---|---|---|
| 752,158 | France | July 10, 1933 |
| 806,693 | France | Sept. 28, 1936 |